United States Patent [19]

Simpson et al.

[11] Patent Number: 4,534,148
[45] Date of Patent: Aug. 13, 1985

[54] ADJUSTABLE ROOFING SUPPORT SPACER APPARATUS AND ERECTION METHOD

[75] Inventors: Harold G. Simpson, Oklahoma City; Leo E. Neyer, Edmond, both of Okla.

[73] Assignee: Encon Products, Inc., Oklahoma City, Okla.

[21] Appl. No.: 503,299

[22] Filed: Jun. 10, 1983

Related U.S. Application Data

[63] Continuation-in-part of Ser. No. 487,614, Apr. 22, 1983.

[51] Int. Cl.³ .................................................. E04B 1/32
[52] U.S. Cl. .......................................... 52/640; 52/66; 52/90; 52/645
[58] Field of Search .................... 52/640, 641, 645, 66, 52/83, 408, 506, 693, 694, 90

[56] References Cited

U.S. PATENT DOCUMENTS 1,918,346  7/1933  McHose ............................ 52/694 X
3,740,917  6/1973  Wong ..................................... 52/694

FOREIGN PATENT DOCUMENTS

2330824  7/1977  France ..................................... 52/693

*Primary Examiner*—Donald G. Kelly
*Assistant Examiner*—Naoko N. Slack
*Attorney, Agent, or Firm*—Bill D. McCarthy

[57] ABSTRACT

The present invention of an adjustable roofing support spacer relates generally to the re-roofing construction area and more particularly to an adjustable roofing support spacer apparatus for use in conjunction with a roof system positionable over a preexisting roof, the roof system having at least one roof panel member, the adjustable roofing support spacer comprising a beam assembly having a first beam spatially disposable above the preexisting roof, one or more adjustable web assemblies connectable to the first beam, and an adjustable roofing support spacer connector means for connecting the adjustable support spacer to the preexisting roof.

6 Claims, 19 Drawing Figures

ADJUSTABLE ROOFING SUPPORT SPACER APPARATUS AND ERECTION METHOD

CROSS-REFERENCES TO RELATED APPLICATION

The subject application is a continuation-in-part of the application entitled ROOF SYSTEM POSITIONABLE OVER AN EXISTING ROOF STRUCTURE AND METHOD OF INSTALLING SAME, Ser. No. 487,614, filed on Apr. 22, 1983.

BACKGROUND OF THE INVENTION

1. Field of the Invention

The present invention relates to an adjustable roofing support spacer for a building structure, and more particularly, but not by way of limitation to a roofing system for positioning a new roof assembly over a preexisting roof structure. In one aspect, the invention relates to a method for installing a roof system over a preexisting roof structure to form a new roof system having a desired planar surface substantially independent of the planar surface of the preexisting roof structure.

2. Discussion of Prior Art

Numerous types of roof assemblies have heretofore been proposed for buildings in an effort to provide a watertight roof assembly, while at the same time enabling the roof assembly to expand and contract as changes in the temperature are encountered. One particular type of roof assembly heretofore used is a substantially flat roof assembly referred to in the construction industry as a temperature are encountered. One particular type of roof assembly heretofore used is a substantially flat roof assembly referred to in the construction industry as a "built-up" roof. Generally such a roof assembly is formed of a plurality of sections which are interconnected and overcoated with asphaltic composition to provide a watertight seal. While such roof assemblies have met general success, problems have nevertheless been encountered in that as the roof assembly ages, or the building settles, or as a result of construction errors the drainage slope of the roof assembly often results in water standing in pockets throughout the roof assembly. This standing water often results in deterioration of the roof assembly causing leaks and the like to occur.

In an effort to repair a roof assembly which has been damaged by the elements, or which has developed leaks therein, problems have been encountered in repairing the roof assembly in a satisfactory manner to prevent similar occurances from happening again. Thus, a need has long been recognized for a roof assembly for reroofing a building which does not require substantial modifications to the preexisting roof assembly and which is economical both in fabrication and on-site construction. Further, it is highly desirable that the new roof assembly be capable of altering the planar surface of the new roof assembly of the building independent of the variations in the planar surface of the preexisting roof assembly. Past repair methods, especially those capable of altering the planar surface of the new roof assembly to improve the drainage characteristics of the building have required substantial destruction of the original roof assembly, thus exposing the building and its contents to damage by the elements during the reroofing process.

SUMMARY OF THE INVENTION

The present invention provides an adjustable roofing support spacer for use with a roof system positionable over a preexisting roof structure having a plurality of roof panels forming a new roof for a building structure. The roofing support spacer apparatus, broadly speaking, comprises a beam assembly having a first beam spatially disposable above the preexisting roof; one or more adjustable web assemblies connected to the first beam; and an adjustable support spacer connector means for connecting the adjustable support spacer to the preexisting roof.

An object of the present invention is to provide an adjustable roofing support spacer for supporting a new roof assembly over a preexisting roof structure which does not require substantial modification or damage to the preexisting roof.

Another object of the present invention, while accomplishing the above stated object, is to provide an adjustable roofing support spacer for supporting a new roof assembly wherein the new roof system is not limited in design and configuration by the preexisting roof.

Another object of the present invention, while achieving the above stated objects, is to provide an adjustable roofing support spacer for supporting a new roof assembly which is substantially independent of the planar surface of the preexisting roof.

Another object of the present invention, while achieving the above stated objects, is to provide an adjustable roofing support spacer for supporting a new roof assembly which is substantially free to move independently of the preexisting roof as the two roofs expand and contract because of building movement, temperature changes and similar forces.

Other objects, features and advantages of the present invention will become clear from a reading of the following detailed description when read in conjunction with the appended claims,

BRIEF DESCRIPTION OF THE DRAWINGS

FIG. 6 is an enlarged, partially broken sectional view of the new roof system taken at 6—6 in FIG. 1.

FIG. 16 is a partially broken side view of the inverted "V" shaped web member utilizing a split upper beam.

DESCRIPTION

Figure 1:
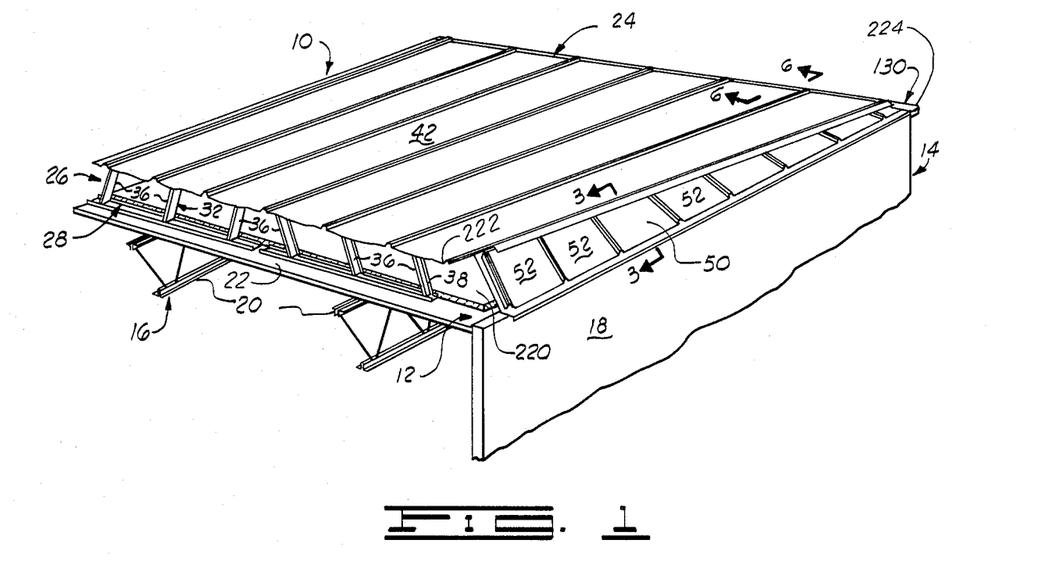
FIG. 1 is a partially broken, isometric view of a structure showing a portion of a new roof system supported over a preexisting roof of the structure via an adjustable roof support spacer constructed in accordance with the present invention.

Referring now to the drawings, and more particularly to FIG. 1, a portion of a new roof system 10 is supported by a preexisting roof 12 of a building structure 14. The preexisting roof 12 of the building structure 14 can be any preexisting roof structure, such as a builtup roof, which is connected to and supported by conventional elements, such as a primarily structural system (not shown), a secondary structural system 16 and a plurality of wall members 18 (only one being shown). The primary structural system of the building structure (not shown) will generally consist of a plurality of upwardly extending column members that are rigidly connected to a foundation and a plurality of primary beams which are generally horizontally disposed and supported by the column members. The secondary structural system 16 comprises a plurality of open web beams or trusses 20, also referred to as bar joists, which are supported by the primary beams and walls of the building structure 14. The web beams or trusses 20 are also generally horizontally disposed.

The roof system 10 will generally be formed of a plurality of roof sections, such as section 24 illustrated in FIG. 1. The roof sections 24 of the roof system 10 are connected to provide a roof plane for the roof system 10 having a desired configuration. For example, the roof sections of the roof system 10 can be disposed on the preexisting roof 12 such that upon intersection of adjacent roof sections, a multi-pitched roof is formed. On the other hand, the roof sections can be joined such that the roof system 10 is provided with a substantially single roof plane, i.e. a roof plane having a unidirectional slope.

The roof section 24 of the roof system 10 is supported by a plurality of adjustable roofing support spacers 26 constructed in accordance with the present invention and disposed along the upper side or surface 22 of the preexisting roof 12 of the building structure 14 so that each of the adjustable roofing support spacers 26 extend upwardly from the preexisting roof 12 in a substantially parallel relationship with the adjacently disposed adjustable roofing support spacers 26 forming a new roof plane for attachment of the roof sections 24.

Figure 2A:
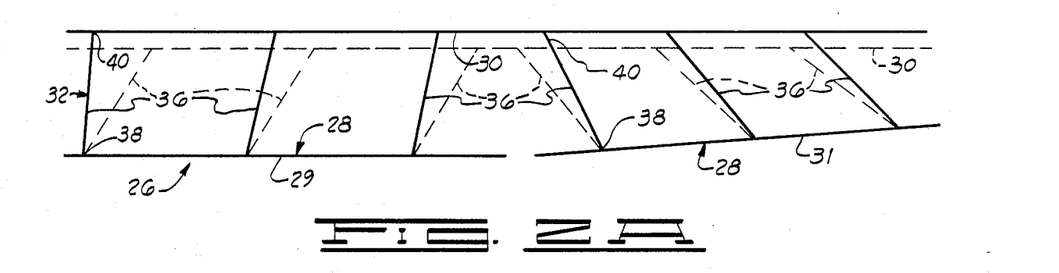
FIG. 2A is a schematic line drawing of an adjustable roofing support spacer constructed in accordance with the present invention wherein the upper beam and base support member(s) of the spacer are in a substantially non-parallel relationship when the spacer is in the assembled position.
Figure 2B:
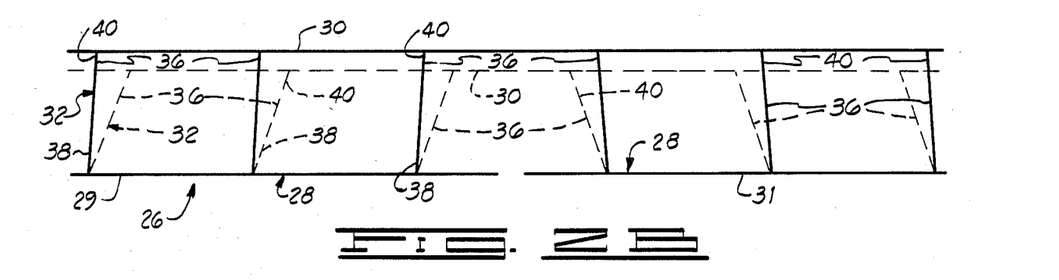
FIG. 2B is a schematic line drawing of an adjustable roofing support spacer constructed in accordance with the present invention wherein the upper beam and base support member(s) of the spacer are in a substantially parallel relationship when the spacer is in an assembled position.

Referring now to FIGS. 2A and 2B, each of the adjustable roofing support spacers 26 is characterized as having a base support member(s) 28, a spatially disposed upper beam 30 and an adjustable web assembly 32 interconnecting the base support member(s) 28 and the upper beam 30. The base support member(s) 28 may be formed as a continuous segment or a plurality of segments as shown in the drawings. When the base support member(s) 28 are formed of a plurality of segments, such as segments 29 and 31, the base support member 28 is adapted to more readily fit the contour of the preexisting roof 12. The base support member(s) 28 provides for load distribution across the area of the base support member(s) 28 onto the preexisting roof 12 in contrast to the concentrated load point that would be present at the lower end of the web assembly 32, were the same support member 28 not there to distribute the load. The web assembly 32 of each of the adjustable roofing support spacers 26 is connected to the upper beam 30 and the base support member(s) 28 at various positions so that the upper beam 30 of each of the adjustable roofing support spacers 26 is disposed a selected height above the base support member(s) 28 (and thus the upper side or surface 22 of the preexisting roof 12) independent of the slope or irregularities that may be present in the preexisting roof 12. For example, in FIG. 2A the line drawing illustrates the adjustable feature of the adjustable roofing support spacer 26 where the upper beam 30 is in a substantially non-parallel relationship with the base support member(s) 28 at a selected height. The phantom line drawings in FIG. 2A illustrate the adjustable roofing support spacer 26 wherein the upper beam is secured in a substantially parallel relationship with the base support member(s) 28 at a second selected height. In FIG. 2B the line drawing illustrates the adjustable feature of the adjustable roofing support spacer 26 when the upper beam 30 is substantially horizontally disposed in a parallel relationship with the same support member(s) 28 at a first selected height; the phantom line drawn in FIG. 2B illustrates the adjustable roofing support spacer 26 wherein the upper beam is secured in a substantially parallel relationship with the base suport member(s) 28 at a second selected height. It is to be understood that the distance between the base support member(s) 28 and the upper beam 30 of the adjustable roofing support spacer 26 can be varied between the geometrical limits of the angular disposition of the adjustable web assembly 32.

Figure 7:
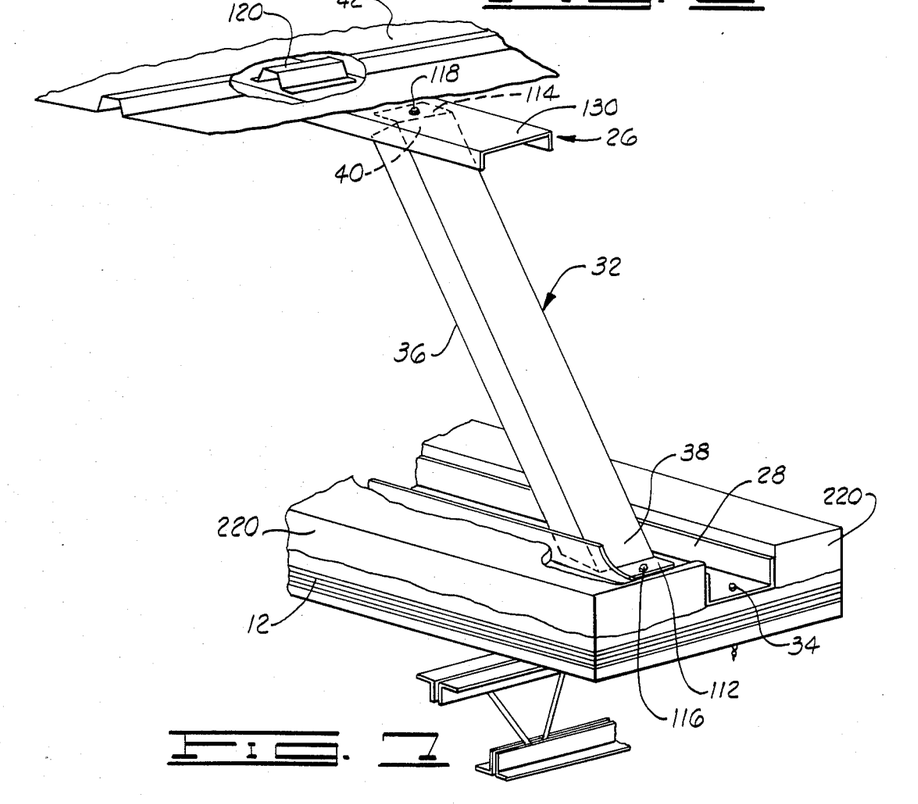
FIG. 7 is an enlarged, partially broken view of one view of the adjustable roofing support spacer of the present invention.

The base support member(s) 28 of each of the adjustable roofing support spacers 26 in the roof section 24 are secured to the preexisting roof 12 via the upper side or surface 22 thereof by any suitable fastener assembly known in the art such as a plurality of self-tapping screws, one such self-tapping screw 34 securing the base support member(s) 28 to the preexisting roof 12 being shown in FIG. 7.

The web assembly 32 of the adjustable roofing support spacer 26 comprises a plurality of spacer webs 36 having a first end portion 38 and an opposed second end portion 40. The first end 38 of each of the spacer webs 36 is secured to the base support member(s) 28 of the adjustable roofing support spacers 26 and the opposed second end 40 of the spacer webs 36 is secured to the upper beam 30. The angular disposition of the spacer webs 36 of the web assembly 32 of the adjustable roofing support spacers 26 is such that the upper beam 30 is maintained in a proper, selected relationship with the base support member(s) 28 and thus the preexisting roof 12 of the building structure 14. The upper beam 30 of each of the adjustable roofing support spacers 26 in the adjacent roof sections 24 may be secured via their adjacently disposed ends by any suitable means known in the art.

A plurality of roof panel members 42 are positioned upon and supported by the upper beam 30 of the spacer webs 36 so as to substantially extend across and form a continuous plane across the upper beams 30. The roof panel members 42 are secured to the upper beams 30 of the adjustable roofing support spacers 26 in such a manner that the roof system 10 is provided with a selected plane substantially independent of the plane of the preexisting roof 12. Any suitable panel fastener assemblies can be employed for connecting the roof panel members 42 to the upper beams 30 of the adjustable roofing support spacers 26, such as self-drilling, self-tapping screws heretofore known in the art and employed in the assembly of roof panels in standing seam and standard corrugated roof assemblies and the like.

The improved roof system 10 further comprises a flashing assembly 50 for interconnecting a wall member of the building structure 14, such as wall member 18, to the adjacently disposed roof panel members of the roof section, such as the roof panel member 42 of the roof section 24. The flashing assembly 50 is desirably formed of a plurality of facade panel members 52 which are interconnected so as to extend substantially along the length of the roof section and provide a substantially continuous surface along the length of the roof section 24 of the building structure 14 as shown in FIG. 1.

Figures 3, 4:
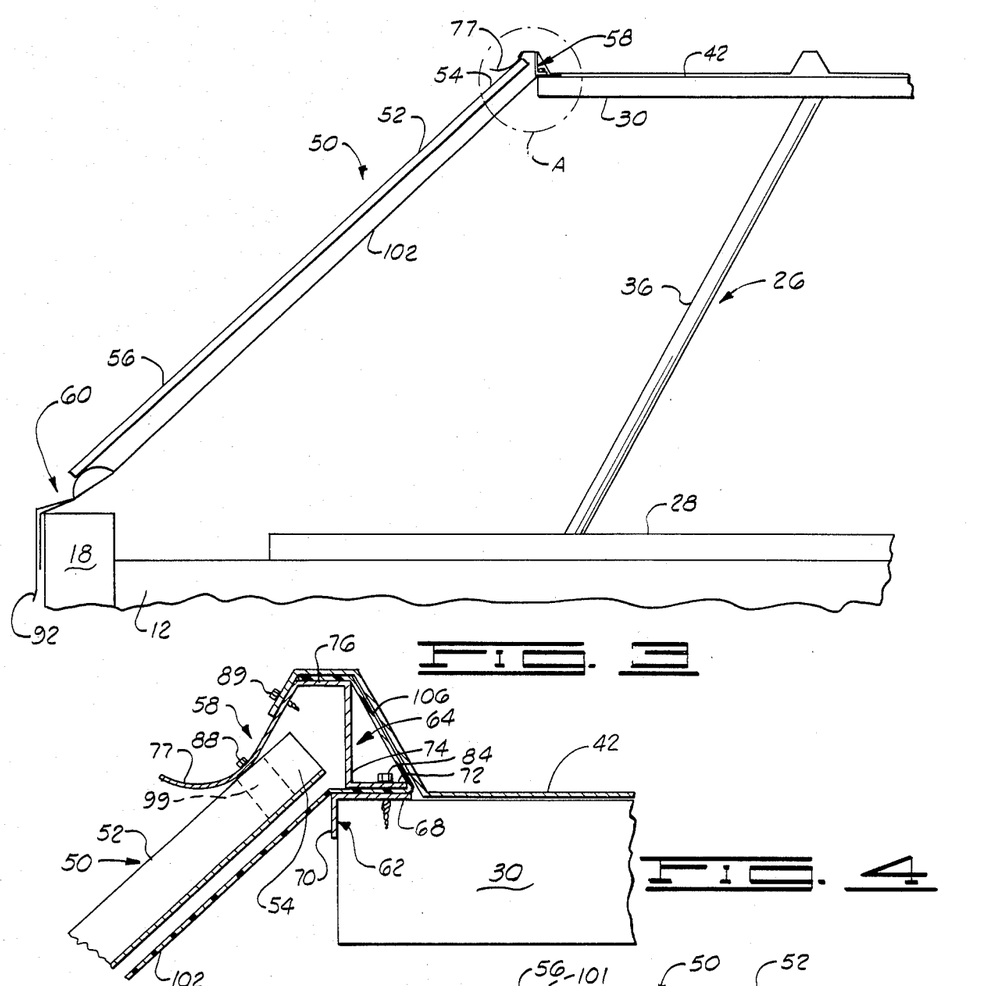
FIG. 3 is an enlarged, partially broken sectional view of the new roof system of the present invention taken at 3—3 in FIG. 1.
FIG. 4 is an enlarged, partially broken sectional view showing the interconnection of flashing to a roof panel on the new roof system and area A in FIG. 3.

Referring now to FIG. 3, the construction of the flashing assembly 50 and the connection of the facade panel members 52 to the wall members of the building structure 14, such as the wall member 18, and the adjacently disposed roof panel members of the roof section, such as the roof panel member 42 of the roof section 24, is illustrated in more detail. Each of the facade panel members 52 is provided with an upper end 54 and an opposed lower end 56. The upper end 54 of each of the facade panel members 52 is connected to the adjacently disposed edge portion of a roof panel member, such as the adjacent edge portion of the roof panel member 42, via a roof connector assembly 58; and the lower end 56 of each of the facade panel members 52 is connected to the upper end portion of an adjacent wall member of the building structure 14, such as the upper end portion of the wall member 18, via a wall connector assembly 60.

Referring now to FIGS. 3 and 4, the roof connector assembly 58 comprises a spacer spanner member 62 and a support member 64. The spacer spanner member 62, a substantially "L" shaped member having a first leg portion 68 and a substantially normally disposed second leg portion 70, is positioned over the end portions of the upper beam 30 of each of the alligned adjustable roofing support spacers 26 in the roof section 24 so as to extend across the upper beam 30 of each of the adjustable roofing support spacers 26 in the roof section 24. The first leg portion 68 of the spacer spanner member 62 is disposed substantially adjacent the upper surface of each of the upper beams 30 so that the second leg portion 70 abuts the end of each of the upper beams 30 of the adjustable roofing support spacers 26 in the roof section 24 substantially as shown in the drawings. The support member 64 comprises a first leg portion 72, a body portion 74, a second leg portion 76, a flashing member 77 is formed on the second end portion of the support member 64, the flashing member 77 being an arcuate shaped member. The first leg portion 72 of the support member 64 is positioned over the first leg portion 68 of the spacer spanner member 62 so that the body portion 74 of the support member 64 is substantially normally disposed to the longitudinal axis of the upper beams 30, and the second end portion 76 of the support member 64 extends outwardly from the ends of the upper beams 30 of the adjustable roofing support spacers 26. The length of the support member 64 substantially corresponding to the length of the spacer spanner member 62 so that the support member 64 extends across the end portions of each of the upper beams 30 of the adjustable roofing support spacers 26 forming a roof section 24.

The first leg portion of the spacer spanner member 64 and the second leg portion 76 of the support member 64 are secured to the upper beams 30 of the adjustable roofing support spacers 26 forming the roof section 24 by any suitable means, such as by self-drilling, self-tapping screw 84. The upwardly turned arcuate shaped flashing member 77 is connected to the upper end 54 of the facade panel members 52 of the flashing assembly 50 by any suitable means, such as self-drilling, self-tapping screw 88. The connection of the spacer spanner member 62, the support member 64 and the arcuate shaped flashing member 77 as described above enables one to readily connect the upper end 54 of the facade panel member 52 of the flashing assembly 50 to the upper beams 30 of the adjustable roofing support spacer 26 forming the roof section 24. Further, the upwardly turned arcuate shaped flashing member 77 formed as a part of support member 64 of the roof connector assembly 58 in combination with the wall connector assembly 60 enables the lower end 56 of the facade panel members 52 to be connected to the upper end portions of the adjacent wall members, such as the upper end portion of the wall member 18 regardless of the angular disposition of the facade panel members 52. Once the facade panel members 52 have been connected to the upper beams 30 of the adjustable roofing support spacers 26 of the roof section 24 via the roof connector assembly 58 as heretofore described, the roof panel member 42 can be disposed over the roof connector assembly 58 and connected thereto by any suitable means, such as self-tapping, self-drilling screw 89.

Figure 5:
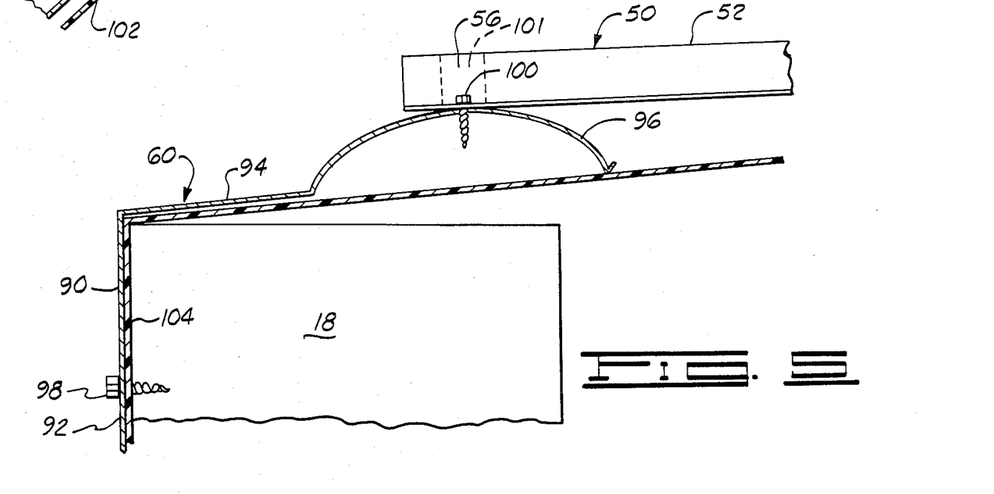
FIG. 5 is an enlarged, partially broken sectional view showing the interconnection of the flashing to a wall of the preexisting structure.

Referring now to FIGS. 3 and 5 the wall connector assembly 60 for connecting the lower end 56 of each of the facade panel members 52 of the flashing assembly 50 to the upper end portion of the wall members 18 of the building structure 14, such as the upper end of the wall member 18 is illustrated. The wall connector assembly 60 comprises a connector plate 90 having a first end portion 92, a body portion 94, and a downwardly curved second end portion 96. The connector plate 90 is positioned over the wall member of the building structure 14, such as the wall member 18, so that the first end portion 92 abuts the wall 18 and is connected thereto by any suitable means, such as screw or shot pin 98. The body portion 94 and the downwardly curved end portion 96 of the connector plate 96 are disposed above the upper end portion of the wall member 18, preferably in a spatial relationship therewith as shown in FIG. 5 of the drawings. The lower end 56 of each of the facade panel members 52 of the flashing assembly 50 is connected to the downwardly curved end portion 96 of the connector plate 90 by any suitable means, such as self-drilling, self-tapping screw 100. The unique configuration of the connector plate 90, including the downwardly curved end portion 96, in combination with the configuration of the arcuate shaped flashing member 77 formed on the second end portion 76 of the support member 64 of the roof connector assembly 58, enables one to connect the facade panel members 52 to the adjacent roof panel 40 and to the upper end portion 56 of the wall members of the building structure 14, such as the wall member 18. For example, the particular angular position of each of the facade panel members 52 can vary along the length of the roof section 24 because of the degree of extension of the adjustable roofing support spacers 26, and the elevation of the roof section 24 above the upper end portion of the wall members of the building structure 14, such as the wall member 18. When the facade panel members 52 are constructed of corrugated materials (as illustrated), plugs, such as plug member 99 (shown in phantom lines) and 101 indicated in phantom in FIGS. 4 and 5, are positioned within the voids formed by interconnection of the corrugations of the facade panel members 52 to arcuate shaped flashing 77 and downwardly curved end portion 96.

The flashing assembly 50 heretofore described provides a unique method for interconnecting the roof panel members 42 of the roof section 24 to the upper end portion of the supporting wall members of the building structure 14, such as the wall member 18. However, when the assembled facade panel members 52 of the flashing assembly 50 are subjected to temperature variations, the facade panel members 52 tend to expand and contract. The expansion and contraction of the facade panel members 52 or construction errors may result in a partial separation of the joints formed between adjacent facade panel members 52 of the flashing assembly 50 of the roof system 10 or between upper end 54 of facade panel member 52 and plug member 99 so that wind driven rain or moisture may penetrate the flashing assembly 50. Thus, the flashing assembly 50 desirably further comprises a flexible membrane 102 disposed under the facade panel members 52 and extending between the roof panel member 42 and the adjacent wall member of the building structure 14, such as the wall member 18. The flexible membrane 102 functions as an internal gutter system to conduct water and moisture from under the roof system 10 due to defects in the construction of the flashing assembly 50 or partial seperation of the joints formed between the adjacent facade panel members 52 of the flashing assembly 50 as a result of expansion or contraction or construction error of the facade panel members 52. To secure the flexible memberane 102 in position below the facade panel members 52, one end portion 104 of the flexible membrane 102 is positioned adjacent the upper end portion of the wall member of the building structure 14, such as the wall member 18 and secured thereto via connector plate 90 and the screw or shot pin 98 of the wall connector assembly 60 as heretofore describesd. The flexible membrane 102 is then stretched taut and a second end 106 of the flexible membrane 102 is disposed over the spacer spanner member 62 and secured thereto via the support member 64 and the self-drilling, sefl-tapping screw 84. The second end portion 106 of the flexible membrane 102 is then lapped over the support member 64. The flexible membrane 102 is disposed below the facade panel members 52 in a spatail relationship with the facade panel members 52 so that the facade panel members 52 do not contact and tear the flexible membrane 102.

As previously stated the roof system 10 of the present invention employs adjustable roofing support spacers 26 capable of being selectively adjusted to provide a desired planar surface for the roof panel members 42 independent of the planar surface of the preexisting roof 12 on which the roof system 10 is secured. Referring now to FIG. 7, the connection to the spacer webs 36 of the web assembly 32 to the base support member(s) 28 and the upper beam 30 of the adjustable roofing support spacers 26 of the roof system 10 are shown in detail. The web assembly 32 comprises a plurality of spacer webs 36. One spacer web 36 is illustrated in FIG. 7. It should be noted that the angular dispostion of the spacer webs may be different for each adjustable roofing support spacer 26, and that the angular disposition of the spacer webs will be dependent upon the selected height of the upper beam 30 of the adjustable roofing support spacer 26, the relationship of the upper beam 30 to the base support member(s) 28, and the plane of the preexisting roof 12.

The upper beam 30 and the base support member(s) 28 of the adjustable roofing support spacer 26 are illustrated as channel members, the channel portion of the base support member(s) 28 adapted to receive the opposed first end portion 38 of the spacer web 36. The spacer web 36, also a channel member further comprises a flange member 112 formed on the first end portion 38 thereof; and a flange member 114 formed on the opposed second end portion 40 thereof. The first end portion 38 of the spacer web 36 then is secured to the base support member(s) 28 of the adjustable roofing support spacer 26 via the flange member 112 and a self-tapping, self-drilling screw 116. The opposed second end portion 40 of the spacer web 36 is secured to the upper beam 30 of the adjustable roofing support spacer 26 via the flange member 114 using a self-tapping, self-drilling screw 118 or other suitable fastening means such as welding. The opposed second end portion 40 of the spacer web 36 is skewed up to about fifteen degrees so that in the assembled position of the base support member(s) 28, the upper beam 30 and the spacer web 36 of the web assembly 32, the upper beam 30 can be maintained in a substantially selected relationship with the base support member(s) 28 and disposed substantially above the base support member(s) 28 independent of the planar surface of the preexisting roof 12. As previously stated, each of the spacer webs 36 forming the web assembly 32 of the adjustable roofing support spacer 26 is positioned independently of the adjacent spacer webs so that the desired relationsip between the upper beam 30 and the base support member(s) 28 of the adjustable roofing support spacer 26 is maintained.

When the adjustable roofing support spacer 26 has been properly positioned on the preexisting roof 12 so that the upper beam 30 of the adjustable roofing support spacer 26 is disposed in the selected position and each of the adjacent adjustable roofing support spacers 26 have likewise been so positioned, the roof panel member 42 is positioned on the upper beam 30 of the adjustable spacers 36 and secured thereto by any suitable means, such as a corrugation support clip 120 and suitable fastening means, such as self-drilling, self-tapping screws (not shown).

Referring now to FIG. 6 the eave portion of the roof system 10 is illustrated in combination with an external gutter assembly 130. The eave portion of the roof section, such as roof section 24, is connected to the top portion of a wall member of the building structure 14, such as an wall member 132 via an eave connector assembly 134. The eave connector assembly 134 is a plate member having a first leg portion 136 and a second leg portion 138. The first leg portion 136 is disposed adjacent to the interior upper portion of the wall member 132 and secured thereto by any suitable means, such as self-tapping, self-drilling screw 140 or power driven shot pin so that the second leg portion 138 is disposed above the wall member 132 and abuts and supports the eave portion of the roof section 24 substantially as shown. The roof section 24, which comprises a plurality of roof panel members, such as roof panel member 42, can be connected to the second leg portion 138 of the eave connector assembly 134 by any suitable means, such as self-tapping, self-drilling screw 142.

The external gutter assembly 130, a trough member extending the length of the eave portion of the roof section 24, comprises a first side 142, a spatially disposed second side 144, a bottom plate 146 interconnecting the first and second sides 142, 144 and and upper flange 148 connected to the upper end of the first side 142 and disposable adjacent to the second leg portion 138 of the eave connector assembly 134. The external gutter assembly 130 is positioned upon and supported by the upper end portion of the wall 132 and secured to the second leg portion 138 of the eave connector assembly 134 via the self-tapping, self-drilling screws 142. The external gutter assembly 130 further comprises a down spout 150 connected to the bottom plate 146 at a position external to the wall member 132, the down spout 150 openly communicating with an opening (not shown) in the bottom plate 146 so that water collected by the trough member of the external gutter assembly 130 can be removed therefrom via the opening (not shown) and the down spout 150. The external gutter assembly 130 is further provided with end cap plates, such as end cap plate 152 for closing off the ends of the trough member.

In order to more fully describe the present invention the method of erection of the roof system 10 as shown in FIGS. 1 thru 15 will now be described. In the formation of the roof section 24 on the preexisting roof 12 of the building structure 14, the initial construction procedures involve the removal of any interferring caps and foreign matter which may be connected to the top portion of the wall members of the building structure 14 to which roof system 10 is to be attached, such as the wall member 18 the wall member 132 or preexisting roof 12. Once the portions of the building structure 14 have been suitably cleared of any interferring material, the eave connector assembly 134 is secured to the wall member located adjacent the eave portion of the roof system 10, such as the wall member 132. The first leg portion 136 of the eave connector assembly 134 is secured to the inner upper portion of the wall member 132 by a plurality of self-tapping, self-drilling screws 140, or power driven shot pins, so that the second leg portion 138 of the eave connector assembly 134 is disposed a selected height relative to the upper end portion of the wall member 132.

Another step in the construction of the roof system 10 is the erection of the adjustable roofing support spacer 26 on the preexisting roof 12 of the building structure 14. The base support member(s) 28 of the adjustable roofing support spacer 26 is secured to the preexisting roof 12 by a plurality of self-tapping, self-drilling screws or other means well known in the art, such that the base support member(s) 28 is disposed substantially parallel to the eave connector assembly 134. The adjustable web assembly 32 of the adjustable roofing support spacer 26, which comprises a plurality of spacer webs 36, is connected to the base support member(s) 28 and the upper beam 30 so that the upper beam 30 is disposed in a substantially horizontal position at a desired selected height above the existing roof 12 of the building structure 14. The adjustable roofing support spacer 26 is temporarily braced so that the spacer web 36 is maintained in its proper position during the operations required in the construction of the roof system 10.

The base support member(s) 28 of the adjustable roofing support spacer 26 of the roof section 24 are then positioned upon the preexisting roof 12 and secured thereto by an suitable means, such as the self-tapping, self-drilling screws 34. The number of adjustable roofing support spacers 26 employed in the formation of the roof section 24 will vary depending upon the overall length of the roof section 24, but desirably the adjustable roofing support spacers 26 are positioned on the preexisting roof 12 so as to be spaced approximately five feet apart. Once the base support member(s) 28 of each of the adjustable spacers have been secured in the desired position on the preexisting roof 12, a tightline is attached to the new roof high point 222 as illustrated in FIG. 1, and the new roof low point 224 as illustrated in FIG. 1. The adjustable web assembly 32 of each of the adjustable roofing support spacers 26 disposed between the adjustable spacers and the eave connector assembly 134 are elevated such that when the upper beam 30 is secured to each of the adjustable web assemblies 32, and the first end portion 38 is secured to the base support member(s) 28, the upper beams 30 are positioned so as to be substantially aligned relative to the tightline and in a substantially common plane with the adjustable roofing support spacer 26 and the eave connector 134. Upper beam 30 of the adjacent adjustable roofing support spacers 26 may be joined end to end.

Once the adjustable roofing support spacers 26 have been properly positioned on the preexisting roof 12 of the building structure 14 as described above, the spacer spanner member 62 of the roof connector assembly 58 is positioned over the end portions of the upper beams 30 of each of the aligned adjustable roofing support spacers 26 forming the roof section 24 so that the spacer spanner member 62 extends across the upper beams 30 of each of the adjustable roofing support spacers 26. If the flexible membrane 102 is to be positioned below the facade panel members 52 of the flashing assembly 50, the first end portion 104 of the flexible membrane 102 is positioned adjacent the upper end portion of the wall member of the building structure 14, such as the wall member 18, and secured thereto via the connector plate 90 of the wall connector assembly 60 and a plurality of self-drilling, self-tapping screws 98. The second end of the flexible membrane 102 is then laid over the spacer spanner members 62 and secured to the spacer spanner member 62 via the support member 64 and a plurality of self-tapping, self-drilling screws 84 in such a manner that any water penetrating the flashing assembly 50 will be collected and drained to the lower end of the flexible membrane 102 and then out of the building where sections of connector plate 90 join each other end to end or at other suitable locations. After the flexible membrane 102 has been secured between the wall structure 18 and the spacer spanner member 62 as described above, the one end of facade panel 52 such as lower end 56 of each of the facade panel members 52 is connected such as to the downwardly curved end portion 96 of the wall connector assembly 60 by a plurality of self-tapping, self-drilling screws 98; and the upper end 54 of each of the facade panel member 52 is connected to the arcuate shaped flashing member 77 of the roof connector assembly 58 via a plurality of self-tapping, self-drilling screws 88. During the attachment of the facade panel members to the roof connector assembly 58 and the wall connector assembly 60 as heretofore described, the facade panel members 52 are interconnected to each adjacent facade panel member 52 in the manner heretofore known in the art.

Prior to attaching the roof panel members 42 to the upper beams 30 of the adjustable roofing support spacers 26 secured to the preexisting roof 12 of the building structure 14, the gutter assembly 130 is positioned on the top portion of the wall member 132. Thereafter, starting with the eave portion of the building structure 14 having the facade panels in place, the roof panel members 42 are positioned across the upper beam 30 of the adjustable spacer 26 and secured thereto by a plurality of self-tapping, self-drilling screws 142. It should be noted that by securing the end portions of the roof panel members 42 to the wall connector assembly 134 via the second leg portion 138 thereof and self-tapping, self-drilling screws 142, the gutter assembly 130 is secured in place to the wall member 130 and below the eave portion of the roof system 10.

When the roof section 24 is of substantial length so that a plurality of roof panel members 42 are required to extend across the upper beams 30 of the adjustable roofing support spacers 26 forming the roof system 10, the roof panel members 42 are overlapped and connected together in a manner heretofore known in the roofing art. The placement of the roof panel members 42 continues across the upper beams 30 of the adjustable roofing support spacers 26 until approaching the opposed side of the building structure 14. At this point the flashing assembly 50 is secured to the other side of the building structure 14 and the upper beams 30 of the adjustable roofing support spacers 26 via the roof connector assembly 58 heretofore described. Similarly, the flashing assembly 50 interconnects the adjustable roofing support spacer 26 and the opposed end wall (not shown) of the building structure 14 in a manner similar to that for attaching the facade panel members 52 of the flashing assembly 50 to the wall member 18.

It is often desirable to incorporate additional insulation material, such as insulation 220, on the preexisting roof 12 of the building structure 14. In such instances, the insulation 220 is positioned on the preexisting roof 12 prior to the attachment of the roof panel members 42 to the upper beams 30 of the adjustable roofing support spacers 26 as heretofore described.

The roof system 10 as constructed above possesses some unique and advantageous properties other than those heretofore mentioned. For example, the roof panel members 42 are attached directly to a laterally structurally stable element such as the eave connector assembly 134 or brace 252 such that the attachment of the roof panel member 42 thereto serves as a pinned connection. This attachment, in combination with the design of the adjustable roofing support spacer 26, and the column strength of the roof panel members 42 enables the roof panel members 42 to retain their substantial roof watertightness and load capacity as the roof panel members 42 expand and contract due to temperature variations or are subjected to other loads. In otherwords, the unique design of the adjustable roofing support spacers 26 is such that there is enough flexability in the adjustable roofing support spacers 26 to allow the spacers to move slightly back and forth as the roof panel members 42 move due to temperature variations, while the pinned connection between roof panel members 42 and the laterally structurally stable element such as connector assembly 134 or brace 252 provide a stable roof system 10 in which the adjustable roofing support spacers 26 will not collapse laterally when the roof system 10 is subjected to a load.

The unique flashing assembly 50 provides a transition and further allows differential movement between wall member 18 which is rigid and roof system 10 which moves because of expansion and contraction and yet maintains an attractive, structurally sound and watertight assembly. As roof system 10 moves facade panel members 52 tends to rotate in the plane of flashing assembly 50 and roof connector assembly 58 and connector assembly 60 deflect to accomodate such rotation in addition elongated holes (not shown) may be formed in flashing member 77, downwardly curved end portion 96, opposed lower end 56 or upper end 54 at the fastener 88 and 100. The elongated holes (not shown) may allow water to penetrate through the elongate holes which is caught by the flexible membrane 102 and drains such water to the outside of the building.

It is clear that the present invention is easily adaptable to various other types of construction and embodiments, some of which will be discussed hereinbelow.

Figure 8:
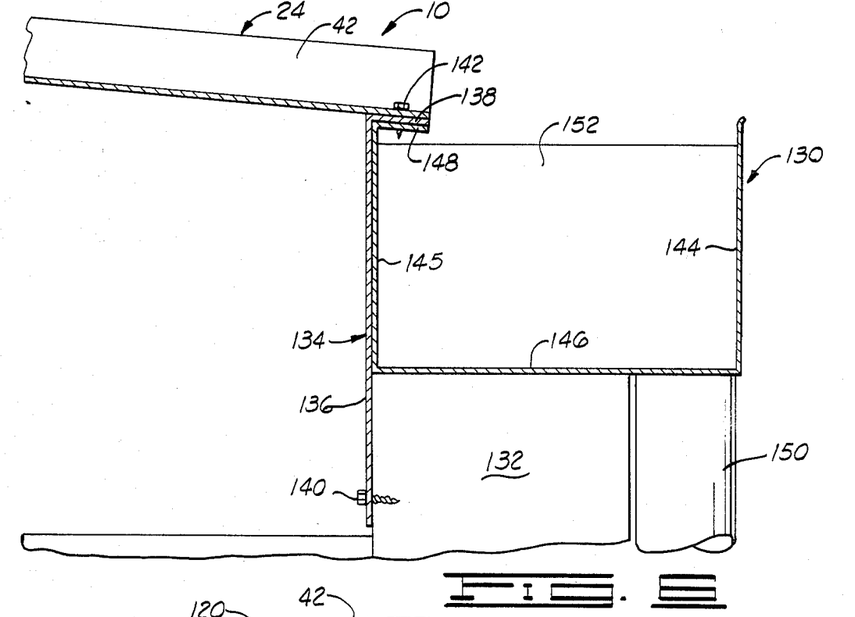
FIG. 8 is an enlarged, partially broken view of the adjustable spacer of the present invention using an inverted "V" shaped web member.

FIG. 8 shows an inverted "V" embodiment of the adjustable web assembly 32A of the present invention. The adjustable web assembly 32A comprises a first flange member 112A and an opposed second flange member 112B, a center flange member 114A and a first and second spacer web member 36A and 36B respectively. The center flange member 114A being connectable to the upper beam 30A by any suitable means known to the art such as a weld, spot weld, or other means.

Figures 8, 9A, 9B, 10:
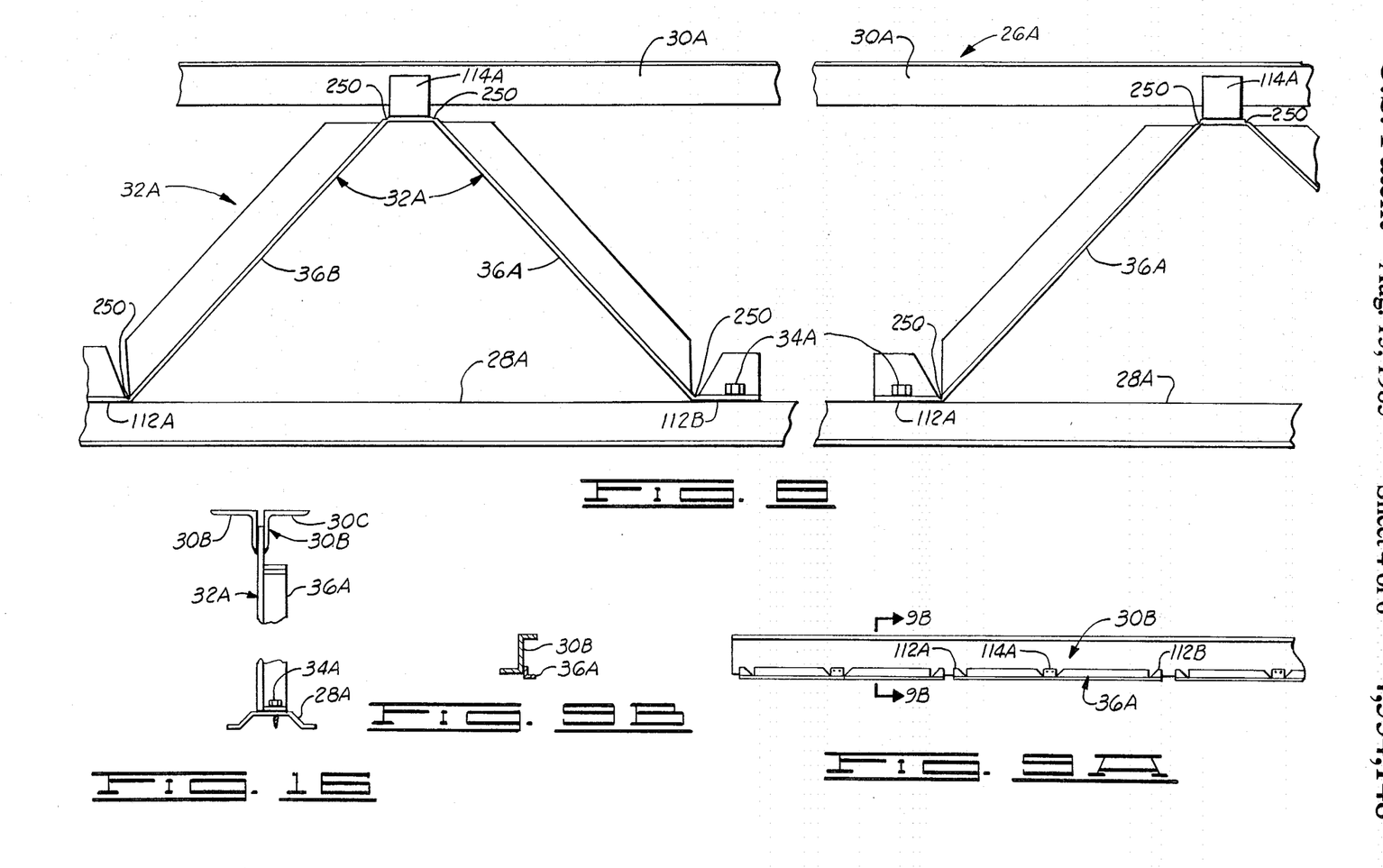
FIG. 9A is a partially broken view of the "Z" shaped upper beam and the attached collapsed inverted "V" shaped web members shown in the shipping position as characterized by the present invention.
FIG. 9B is a side view of 9A.
FIG. 10 is a view of the present invention utilizing the inverted "V" web member and "Z" shaped upper beam where the upper beam is shown at a slope relative to the lower beam.
Figure 10:
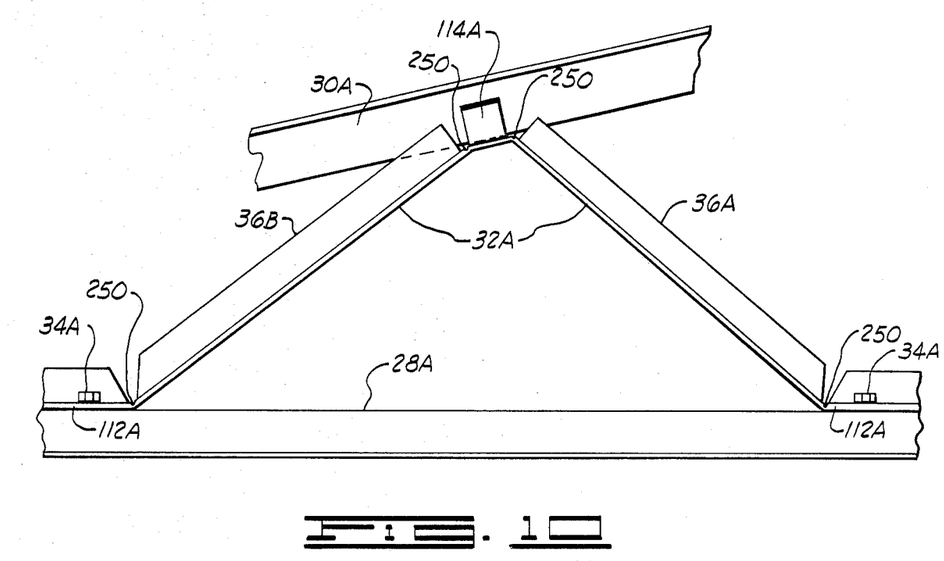

The adjustable web assembly 32A may be attached at a factory to the upper beam 30A so it is substantially parallel and nested with the upper beam 30A for ease of shipping and later on-site errection, as is shown in FIG. 9A and 9B. The spacer webs 36A and 36B would be assembled in the factory in such a manner that these members lay adjacent to the upper beam 30B. The assembly being shipable to the field in a compact manner to minimize shipping cost and to use factory labor to make the connection rather than the more expensive field labor. By factory connecting the spacer web assembly 32A to the upper beam 30B an advantage is given in that the two pieces are in the proper relationship with each other when they reach the field and are needed. It is often time consuming and expensive to locate, separate and bring the various components into proper position for on-site assembly. The field assembly of the upper beam 30A and adjustable web assembly 32A to base support member 28A is accomplished by moving the web members 36A and 36B out from the upper beam 30A to an angular position so as to approximate the selected height of the new roof from the upper beam 30A to the base support member 28A. The flange members 112A and 112B are bent to a position that the plane of the flanges 112A and 112B are substantially the same as the base support member(s) 28A. Final adjustment is made by moving flanges 112A and 112B different distances apart such that the upper beam 30A is raised to the height of the tightline that was installed as discussed hereinabove. The flange 112A is secured to the base support member 28A by a self-tapping, self-drilling screw 34A, or other suitable means known in the art. A web member 36A at the opposing end of the adjustable support spacer 26A is attached in a similar manner upon postioning the upper beam 30A at the appropriate height.

The adjustable web assembly 32A may have bend scores 250 made during the manufacturing process to facilitate the ease of erection while on-site, and is shown in FIG. 8 at the first and second end flanges 112A and 112B and at the first and opposed second side of the center flange member 114A. On-site erection would be substantially as discussed hereinabove, with the additional steps of bending the web members 36A and 36B downwardly at the appropriate angle to achieve the selected height of the new roof. The first and second end flanges 112A and 112B could be bent to the appropriate angle by any suitable means known in the art such as bending with a duckbil pliers(not shown). The first and second end flanges 112A and 112B are attached to the base support member(s) 28A by any suitable means known in the art such as a self-tapping, self-drilling screw 34A.

FIG. 10 is a view of the present invention utilizing the inverted "V" adjustable web assembly 32A showing the position of the first and second web members 36A and 36B where the plane of the upper beam 30A is sloped in relationship to the plane of the base support member(s) 28A. Erection of this embodiment is as discussed hereinabove.

Figure 11:
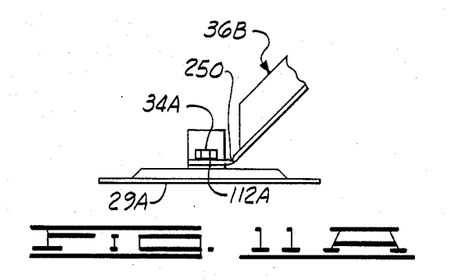
FIG. 11A is a side view of a base plate used to attach the present invention to the preexisting roof.
FIG. 11B is a top plan view of the base plate used to attach the present invention to the preexisting roof.
Figure 11B:
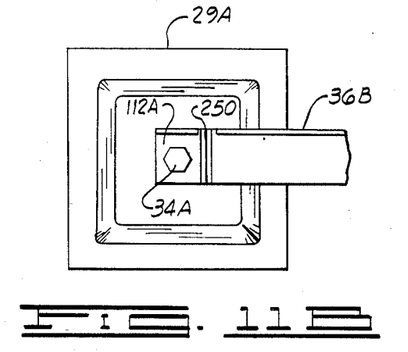

FIG. 11A illustrates a side view of a base plate 29A, said base plate 29A being used as the base support member 28A in the present invention. The base plate 29A is connectable to the adjustable web assembly 32A, first and second end flange members 112A and 112B by any suitable means known in the art such as a self-tapping, self-drilling screw 34A. The base plate 29A, also shown in top plan view in FIG. 11B, is connectable to the preexisting roof 12 by any suitable means known in the art such as a weld to the preexisting roof structurals. In certain instances it may be desirable to connect flange members 112A and 112B directly to the underlying preexisting roof 12. This is done by removing portions of the preexisting roof 12 so that flange members 112A and 112B rest on and are connected to structurally sound portions of the preexisting roof 12. The connection between flange members 112A and 112B and preexisting roof 12 would be made by any means known in the art such as self-tapping, self-drilling screws.

Figure 12:
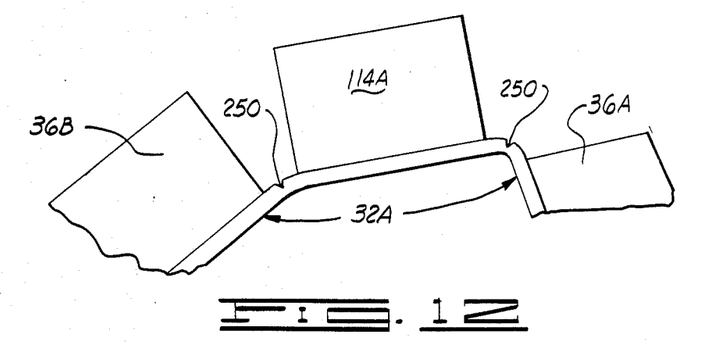
FIG. 12 is an isometric view of the upper portion of the inverted "V" web member showing the bend scores.

FIG. 12 is a drawing of the adjustable web assembly 32A giving an enlarged view of the upper portion of the adjustable web assembly 32A to illustrate the placement of the bend scores 250 which may be put onto the adjustable web assembly 32A during the fabrication of the adjustable web assembly 32A and are used to facilitate the ease of bending the first and opposed second web members 36A and 36B to the appropriate angle to elevate the first (upper) beam 30A to the selected height of the new roof.

Figure 13:
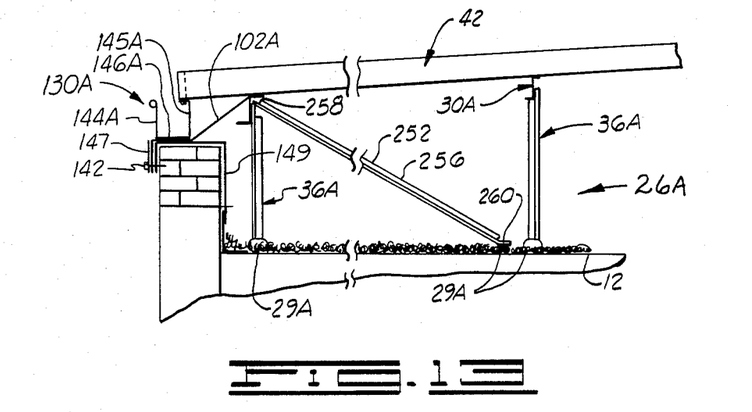
FIG. 13 is an isometric view of the present invention showing the use of a brace member used for lateral support.

FIG. 13 is a view of the present invention showing the use of a brace 252 for lateral support of the adjustable roofing support spacer 26. The brace 252 comprises a brace member 256 and a first and opposed second flange member 258 and 260 respectively. The brace 252 made be manufactured of any suitable material such as a tubular stock or "L" beam stock, and then fabricated to form the first and opposed second end flanges 258 and 260 respectively, additionally bend scores 250 may be placed at the first and second end flanges 258 and 260 as discussed hereinabove. Brace 252 first flange member 260 is connected to the preexisting roof 12 by any suitable means known in the art such as self-tapping, self-drilling screw (not shown). Brace 252, flange member 258 is connected to upper beam 30A by any suitable means known in the art such as a self-tapping, self-drilling screw (not shown) so as to support the adjustable roofing support spacer 26A to prevent lateral movement. Flexible membrane 102A is adapted to rest on the first interior adjustable roofing support spacer 26A, upper beam 30A and extends transversely over wall member 18 so that it passes under the gutter assembly 130A in such a manner that any water entering between roof 42 and gutter assembly 130A is drained to the exterior of the building by appropriate channels 146A extending over the lower portion of the flexible membrane 102A and gutter assembly 130A.

Figure 14:
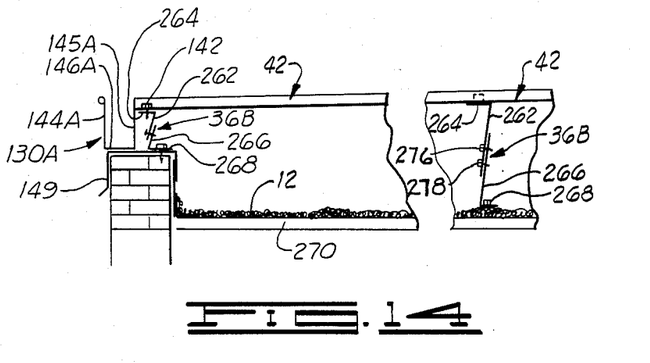
FIG. 14 is an isometric view of the "Z" embodiment of the present invention.

FIG. 14 shows a further embodiment of the adjustable roofing support spacer 26 which is a "Z" adjustable roofing support spacer assembly 36B comprising a first web member 262, a first flange 264, a second web member 266 and a second flange 268. The first web member 262 is adjustably overlappingly disposed to the second web member 266 and is adjusted to the selected height of the new roof in accordance with procedures discussed herein above. The first flange 264 is connectable to the roof panel 42 by any suitable means known in the art as discussed hereinabove. The second flange 268 is connectable to the preexisting roof 12 by any suitable means known in the art as discussed hereinabove. The first web 262 is connected to the second web 266 by any suitable means known in the art such as one or more nuts and bolts. The nuts and bolts may be inserted through a slot in both the first web 262 and the second web 266 (slot not shown) such that loosening the nut and bolt will allow the two members to increase or decrease the amount of overlapping and thus the distance between the first and second flange 264 and 268. After the desired initial overlapping has been accomplished using the easily adjustable bolts and nuts the overlapping position is secured by connecting webs 262 and 266 with non-slip connection means such as welding, or self-tapping, self-drilling screws.

Figure 15:
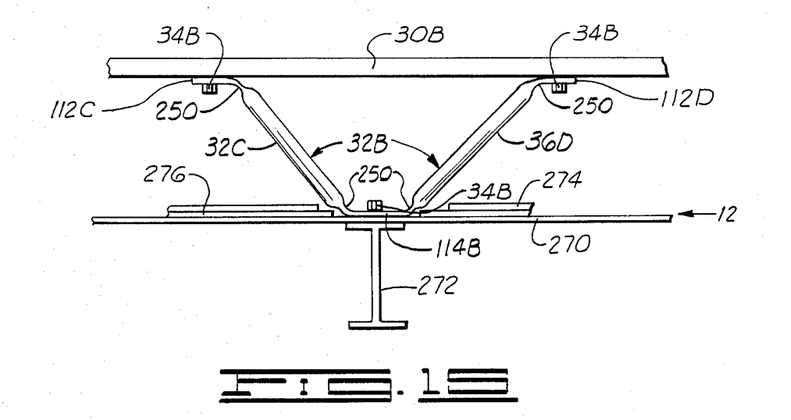
FIG. 15 is a view of the "Tube" embodiment of the web members of the present invention.

FIG. 15 is an isometric drawing of an inverted "V" adjustable web assembly 32B fabricated from tubular stock. The adjustable web assembly 32B comprises a first and second web members 36C and 36D, center flange member 114B and the first and second end flange members 112C and 112D. The adjustable web assembly 32B may also employ bend scores 250 at the flange members 114B and 112C and 112D as discussed hereinabove. After removing structurally weak or unsound material such as insulation 276 and water proofing material 274 the center flange member 114B is connectable to a structurally sound portion of preexisting roof 12 such as beam 272 by any suitable method known in the art and discussed hereinabove. The first and second end flange members 112C and 112D may be connected to the upper beam 30A by any suitable means known in the art as discussed hereinabove.

FIG. 16 shows an end view of the adjustable web assembly 32A for illustration of the upper beam assembly 30A, which comprises a first "L" beam member 30B and an opposed second "L" beam member 30C. The first and opposed second "L" beam members 30B and 30C may be connected to the adjustable web member 32A by any suitable means as discussed hereinabove, the FIG. 16 shows an embodiment using a weld connection means. FIG. 16 also illustrates the end view of the base support member(s) 28A of the present embodiement.

It is clear that the present invention and its various embodiments may be reversed in its construction and erection according to varying construction and manufacturing requirements. For instance, the inverted "V" adjustable web assembly 32 could be utilized as a "V" adjustable web assembly 32B as shown in FIG. 15 with the center flange 114B being connectable to the preexisting roof 12 structurals by any suitable means known in the art such as by welding means, and the first and second web members 36C and 36D extended upwardly from the preexisting roof 12 to the selected height of the new roof and the first (upper) beam 30A connected to the first and second flanges 112B by any suitable means known in the art and discussed hereinabove. The erection methods would be substantially the same as those discussed hereinabove.

It is clear that the present invention is well adapted to carry out the objects and attain the ends and advantages mentioned herein as well as those inherent in the invention. While presently preferred embodiments of the invention have been described for the purposes of this disclosure, numerous changes may be made which will readily suggest themselves to those skilled in the art and which are accomplished within the spirit of the invention disclosed and as defined in the appended claims.

What is claimed is:

1. An adjustable roofing support spacer apparatus positionable on a preexisting roof to partially support at least one roof panel member, comprising:
   a first beam;
   a second beam supported by the preexisting roof;
   connector means for connecting the second beam to the preexisting roof; and
   adjustable web means for interconnecting the first and second beams and for supporting the first beams so that it is disposed above the second beam in a selected plane independent of the slope of the preexisting roof, the adjustable web means comprising a plurality of spacer webs and attaching means for attaching the spacer webs to the first and second beams and determining the relative disposition of the first and second beams at the site of the preexisting roof so that the first beam is supported at selected heights along the length thereof above the preexisting roof.

2. The adjustable roofing support spacer apparatus of claim 1 wherein each spacer web comprises a first web member angularly downwardly disposed from the first beam, a second web member angularly upwardly disposed from the second beam, the first and second web members being overlappingly disposed and adjustable with relationship to the first and second web members such that the spatial distance between the first and second beam will vary with the adjustment of the amount of the overlap of the first and second web members and further comprising connector means for adjustably interconnecting the first and second web members.

3. The adjustable roofing support spacer of claim 1 wherein the adjustable web assembly comprises one or more bend scores along each of the spacer webs to facilitate bending in field assembly.

4. A method for reroofing a preexisting roof of a structure with a new roof slope independent of the slope of the preexisting roof structure, the structure having a plurality of walls, each wall having an upper end portion, the method comprising the steps of:
   securing an eave connector assembly to the upper end portion of one of the walls of the structure;
   securing an adjustable roofing support spacer to the preexisting roof such that the adjustable roofing support spacer is disposed at a location on the preexisting roof substantially corresponding to the ridge of the new roof structure and substantially parallel to the eave connector assembly, the adjustable roofing support spacer further characterized as having a first beam, a second beam and an adjustable web assembly disposed between and interconnecting the first beam and the second beam;
   connecting the second beam to the preexisting roof;
   adjusting the adjustable web assembly of the adjustable roofing support spacer so that the first beam thereof is substantially horizontally disposed a selected distance above the second beam and independent of the slope of the plane of the preexisting roof;
   positioning at least one panel member across the first beam of the adjustable roofing support spacer and the eave connector assembly such that the panel member is supported thereby; and
   connecting the panel member to the first beam of the adjustable roofing support spacer and the eave connector assembly to provide the new roof structure having a roof plane substantially independent of the roof plane of the preexisting roof.

5. The method of reroofing a preexisting roof of claim 4 further comprising, prior to connecting the panel members to the first beam of the adjustable roofing support spacer and the eave connector assembly, the steps of:
   securing at least one end of an adjustable roofing support spacer to the preexisting roof;
   attaching a tight line to the new roof low point and to the new roof high point;
   elevating the opposing end of the adjustable roofing support spacer to a selected height as determined by the tight line; and
   securing an adjustable web assembly at the opposing end of the adjustable roofing support spacer and then securing the remaining adjustable web assemblies such that in the assembled, elevated position of each adjustable roofing support spacer the first beam is disposed in a substantially common plane with the high and low points of the new roof.

6. A method for reroofing an existing roof of a structure to provide a new roof having a configuration substantially independent to that of the existing roof, the method comprising the steps of:
   securing a lower segment of a first adjustable support spacer to the existing roof, the first adjustable support spacer having an upper beam and an adjustable web assembly disposed between and interconnecting the lower segment and upper beam;

securing a lower segment of at least one other adjustable support spacer to the existing roof, each such other adjustable support spacer having an upper beam and an adjustable web assembly disposed between and interconnecting its lower segment and upper beam, the lower segment of each such adjustable support spacer disposed in a selected relation with the lower segment of the first adjustable support spacer;

adjusting the web assembly of the first adjustable support spacer so that the upper beam thereof is disposed in a first determined relation with the existing roof;

adjusting the web assembly of each such other adjustable support spacers so that the upper beam of each is disposed in another determined relation with the existing roof, the determined relation of each such upper beam being selectively one of the same as the first determined relation and different from the first determined relation with the existing roof;

positioning at least one panel member on the upper beams of the first adjustable support spacer and each such other adjustable support spacers so that the panel member is supported thereby; and connecting the panel member to the upper beams of the adjustable support spacers.

* * * * *

UNITED STATES PATENT AND TRADEMARK OFFICE
CERTIFICATE OF CORRECTION

PATENT NO. : 4,534,148

DATED : August 13, 1985

INVENTOR(S) : Harold G. Simpson and Leo E. Neyer

It is certified that error appears in the above-identified patent and that said Letters Patent is hereby corrected as shown below:

The heading, [56], entitled References Cited, U.S. Patent Documents, please insert --4,016,256  8/1978  Cody  52/694X --.

Signed and Sealed this

Tenth Day of November, 1987

Attest:

DONALD J. QUIGG

*Attesting Officer*

*Commissioner of Patents and Trademarks*